United States Patent
Mallary

(12) United States Patent (10) Patent No.: US 6,842,313 B1
Mallary (45) Date of Patent: Jan. 11, 2005

(54) FLOATING DOWN STREAM PERPENDICULAR WRITE HEAD SHIELD

(75) Inventor: Michael Mallary, Sterling, MA (US)

(73) Assignee: Maxtor Corporation, Longmont, CO (US)

(*) Notice: Subject to any disclaimer, the term of this patent is extended or adjusted under 35 U.S.C. 154(b) by 177 days.

(21) Appl. No.: 10/365,287

(22) Filed: Feb. 12, 2003

Related U.S. Application Data

(60) Provisional application No. 60/371,167, filed on Apr. 8, 2002.

(51) Int. Cl.[7] .............................. G11B 5/39; G11B 5/187
(52) U.S. Cl. .......................... 360/319; 360/317; 360/126
(58) Field of Search ................................. 360/317, 319, 360/121, 123, 125, 126

(56) References Cited

U.S. PATENT DOCUMENTS

| | | | |
|---|---|---|---|
| 4,253,127 A | 2/1981 | Kodama et al. | 360/125 |
| 4,317,148 A | 2/1982 | Chi | 360/119 |
| 4,423,450 A | 12/1983 | Hamilton | 360/111 |
| 4,644,432 A | 2/1987 | Heim | 360/123 |
| 4,656,546 A | 4/1987 | Mallary | 360/110 |
| 4,672,493 A | 6/1987 | Schewe | 360/125 |
| 4,748,525 A | 5/1988 | Perlov | 360/110 |
| 5,041,922 A | 8/1991 | Wood et al. | 360/55 |
| 5,075,956 A | 12/1991 | Das | 29/603.14 |
| 5,111,352 A | 5/1992 | Das et al. | 360/321 |
| RE33,949 E | 6/1992 | Mallary et al. | 360/110 |
| 5,176,965 A | 1/1993 | Mallary | 428/694 BM |
| 5,431,969 A | 7/1995 | Mallary | 427/599 |
| 5,680,283 A | 10/1997 | Tanaka et al. | 360/125 |
| 5,801,910 A | 9/1998 | Mallary | 360/126 |
| 5,830,590 A | 11/1998 | Gooch et al. | 428/694 TM |
| 5,843,565 A | 12/1998 | Davies et al. | 428/212 |
| 6,101,067 A * | 8/2000 | Matsuzono et al. | 360/317 |
| 6,330,122 B1 * | 12/2001 | Chang et al. | 360/31 |
| 6,337,784 B2 * | 1/2002 | Narumi et al. | 360/319 |
| 6,407,891 B1 * | 6/2002 | Chang et al. | 360/317 |
| 6,618,227 B2 * | 9/2003 | Yano et al. | 360/317 |
| 2003/0235014 A1 * | 12/2003 | Yamanaka et al. | 360/317 |

* cited by examiner

*Primary Examiner*—Jefferson Evans
(74) *Attorney, Agent, or Firm*—Robert G. Crouch; Marsh Fischmann & Breyfogle LLP

(57) ABSTRACT

A read/write head for a disk drive having a magnetoresistive (MR) read element and an inductive write element suitable for perpendicular recording of data onto a disk having a media layer in which the data is stored perpendicularly to the planar surface of the disk and a soft underlayer (SUL) underneath the media layer to provide a low reluctance return path for the magnetic recording field. The read element includes an MR sensor sandwiched between a pair of shields. The write element includes a vertically-oriented write pole and a horizontally-oriented yoke that connects the write pole and the adjacent shield of the read element. One or more pancake coils are looped around the yoke to produce a magnetic field that is focused by the tip of the write pole which is relatively smaller than the remainder of the write pole. A floating write shield is located downstream of the write pole, the shield having a throat region in close proximity to the write pole and a ramp portion sloping away from the write pole.

52 Claims, 4 Drawing Sheets

FLOATING DOWN STREAM PERPENDICULAR WRITE HEAD SHIELD

CROSS-REFERENCE TO RELATED APPLICATIONS

This application claims priority from U.S. Provisional Patent Application No. 60/371,167, filed Apr. 8, 2002, entitled "Floating Down Stream Perpendicular Write Head Shield", the contents of which are incorporated herein by reference.

FIELD OF THE INVENTION

This application relates to techniques and arrangements for write heads in data storage applications, particularly write heads for perpendicular recording.

BACKGROUND OF THE INVENTION

In hard disk drives, data is written to and read from magnetic recording media, herein called disks. Typically, one or more disks having a thin film of magnetic material coated thereon are rotatably mounted on a spindle. A read/write head mounted on an actuator arm is positioned in close proximity to the disk surface to write data to and read data from the disk surface.

During operation of the disk drive, the actuator arm moves the read/write head to the desired radial position on the surface of the rotating disk where the read/write head electromagnetically writes data to the disk and senses magnetic field signal changes to read data from the disk. Usually, the read/write head is integrally mounted in a carrier or support referred to as a slider. The slider generally serves to mechanically support the read/write head and any electrical connections between the read/write head and the disk drive. The slider is aerodynamically shaped, which allows it to fly over and maintain a uniform distance from the surface of the rotating disk.

Typically, the read/write head includes a magnetoresistive read element to read recorded data from the disk and an inductive write element to write the data to the disk. The read element includes a thin layer of a magnetoresistive sensor stripe sandwiched between two magnetic shields that may be electrically connected together but are otherwise isolated. A current is passed through the sensor stripe, and the resistance of the magnetoresistive stripe varies in response to a previously recorded magnetic pattern on the disk. In this way, a corresponding varying voltage is detected across the sensor stripe. The magnetic shields help the sensor stripe to focus on a narrow region of the magnetic medium, hence improving the spatial resolution of the read head.

The write element typically includes a coil of wire through which current is passed to create a magnetic field that can be directed toward an adjacent portion of the disk by a ferromagnetic member known as a write pole. While it is known that the write element can be arranged to either store data longitudinally or perpendicularly on the disk, most, if not all, commercial disk drives to date have utilized longitudinal recording arrangements. Although perpendicular recording techniques have the potential to allow for higher densities of recorded information, longitudinal recording is used in all current products for historical reasons. An early perpendicular recording technique is disclosed in U.S. Pat. No. RE 33,949, the contents of which are incorporated herein by reference.

Most perpendicular recording techniques proposed to date have suffered from one of the following problems. Some techniques do not sufficiently control their return flux to the write pole so as to avoid degrading or erasing information recorded downstream or on an adjacent track. Most proposed techniques have not been directed at current generation read/write heads where separate elements perform the read function and the write function. Some proposed techniques may work well in theory, but are difficult or expensive to manufacture due to the specific architecture required. In addition, although some unshielded perpendicular recording techniques have been considered, it is recognized that the field gradient from the write pole to the recording medium can be much higher with a shield as compared to without a shield.

With the advent of separate read and write elements due to the popularity of magnetoresistive technology and with continued pressure to design disk drives with higher densities of recorded information, there is a need for integrated and improved perpendicular recording techniques. It is against this background and a desire to improve on the prior art that the present invention has been developed.

SUMMARY OF THE INVENTION

In view of the foregoing, a broad objective of the present invention is to provide a perpendicular recording arrangement that is integrated with a magnetoresistive read element. Another objective of the present invention is to provide a perpendicular recording arrangement that is commercially feasible to manufacture. Another objective is to provide a perpendicular recording arrangement that meets the above two requirements and also has acceptable performance characteristics.

In carrying out these and other objectives, features, and advantages of the present invention, a read/write head for a disk drive that is suitable for perpendicularly recording data in adjacent magnetic recording media is provided. The head includes a first and second shield, a magnetoresistive sensor located between the first and second shield, a write pole located proximate the second shield, and one or more electrically conductive coils located between the write pole and the second shield. The head also includes a write shield located proximate an opposite side of the write pole from the second shield, wherein the write shield is spaced apart from the write pole so as not to be in contact therewith.

The head may further include a yoke located inside of the conductive coils and extending between the write pole and the second shield. The write shield may be thicker, in a dimension parallel to and closest to the surface of the adjacent magnetic recording media that is generally parallel to the direction of travel of the adjacent magnetic recording media, than is a tip of the write pole closest to the adjacent magnetic recording media, in a corresponding dimension. The height dimension of the write shield perpendicular to the surface of the adjacent magnetic recording media may be significantly less than the corresponding height dimension of the write pole. The write shield may be wider, in a dimension parallel to and closest to the surface of the adjacent magnetic recording media that is generally perpendicular to the direction of travel of the adjacent magnetic recording media, than is a tip of the write pole closest to the adjacent magnetic recording media, in a corresponding dimension. The area of the write shield that is facing the adjacent magnetic recording media may be significantly greater than the area of a tip of the write pole that is facing the adjacent magnetic recording media.

The write shield may have a surface facing toward the write pole that includes a first surface portion and a second surface portion, the first surface portion being relatively closer to the write pole than is the second surface portion. The first surface portion may be relatively closer to the surface of the adjacent magnetic recording media than is the second surface portion. The first surface portion may be a throat portion and the second surface portion may be a ramp portion. The first surface portion of the write shield may have a dimension in a direction perpendicular to the adjacent magnetic recording media with a height that is substantially equal to or greater than one-half the distance from the write shield to the write pole.

The adjacent magnetic recording media may be caused to move relative to the read/write head in a direction that causes a given portion of media to pass first by the magnetoresistive sensor and then by the write pole and then by the write shield. There may be no conductive coils on the opposite side of the write pole from the second shield. The one or more electrically conductive coils may be in a pancake-shaped arrangement. The adjacent magnetic recording media may have at least two layers, a media layer relatively closer to the read/write head and a soft underlayer relatively farther from the read/write head, with the distance from the write shield to the soft underlayer being approximately equal to the distance from the write shield to the write pole. The magnetic impedance between the write pole and the write shield may be significantly greater than the magnetic impedance between the write shield and the adjacent magnetic recording media.

According to another aspect of the present invention, a read/write head for a disk drive is provided, the head being suitable for perpendicularly recording data in adjacent magnetic recording media. The head includes a first and second shield, a magnetoresistive sensor located between the first and second shield, a write pole located proximate the second shield, one or more electrically conductive coils located between the write pole and the second shield, and a write shield located proximate an opposite side of the write pole from the second shield. There are no conductive coils on the opposite side of the write pole from the second shield.

The write shield may be spaced apart from the write pole so as not to be in contact therewith.

According to another aspect of the present invention, a read/write head for a disk drive is provided, the head being suitable for perpendicularly recording data in adjacent magnetic recording media. The head includes a read element with a first and a second read shield and a magnetoresistive sensor located between the first and second read shields. The head also includes a write element with a return flux write pole located proximate the second shield, a main write pole located proximate the return flux write pole, one or more electrically conductive coils located between the return flux write pole and the main write pole, and a write shield located proximate an opposite side of the main write pole from the return flux write pole. The write shield is spaced apart from the write pole so as not to be in contact therewith.

Numerous additional features and advantages of the present invention will become apparent to those skilled in the art upon consideration of the further description that follows.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with disk drives, it should be expressly understood that the present invention may be applicable to other applications where magnetic recording of data is required/desired. In this regard, the following description of a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application (s) or use(s) of the present invention.

Figure 1:
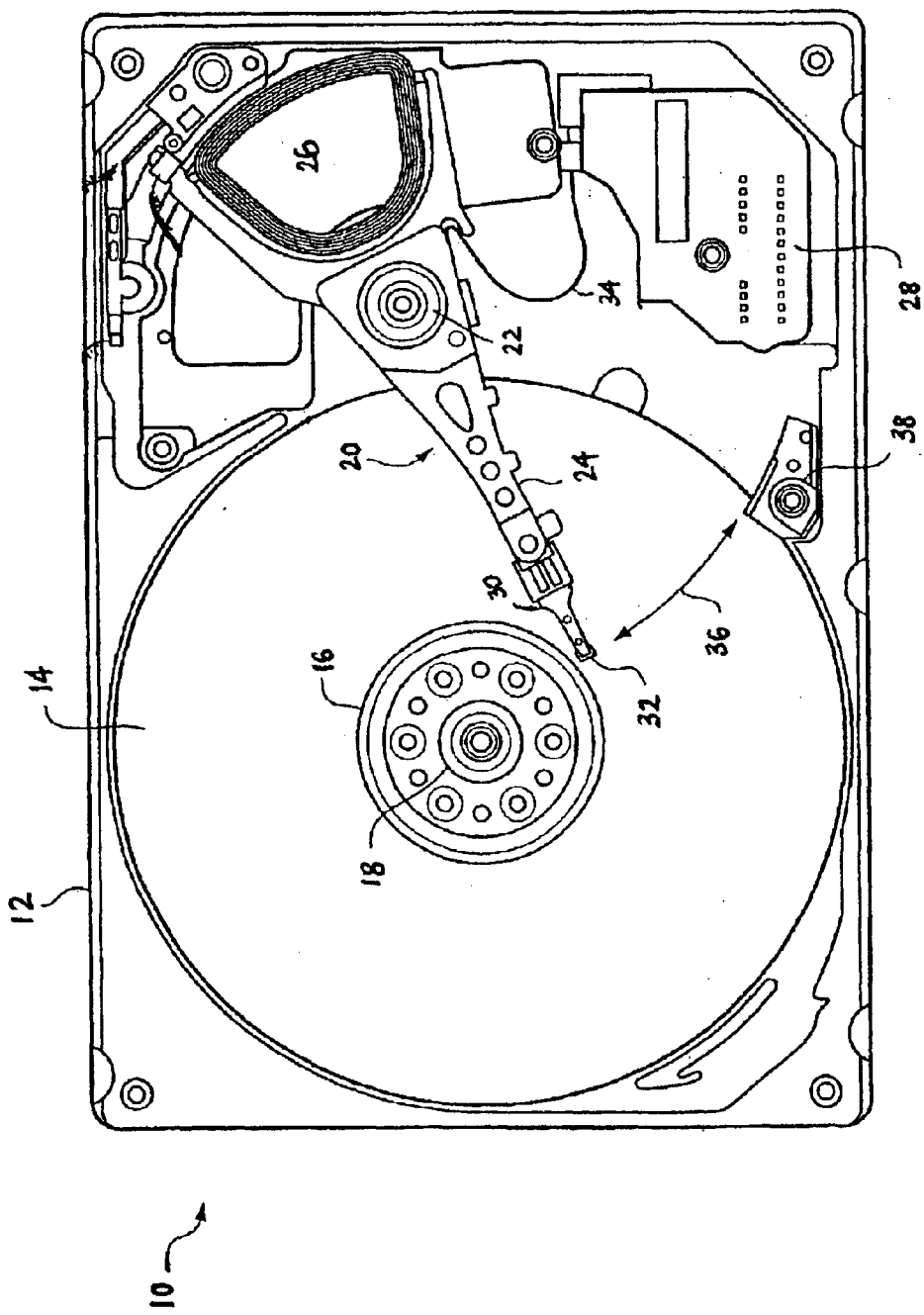
FIG. 1 is a top view of a disk drive that utilizes a head of the present invention.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance (ARIR) of 2–4%. GMR results from spin-dependent scattering mechanisms between two (or more) magnetic layers. The typical use in recording heads is the spin valve device that uses a pinned magnetic layer and a free layer to detect external fields. The normalized change in resistance is typically 8–12%, but can be as large as 15–20% when used with specular capping layers and spin-filter layers. TuMR is similar to GMR, but is due to spin dependent tunneling currents across an isolation layer. The typical embodiment includes a free layer and a pinned layer separated by a insulating layer of $Al_2O_3$ with the current flowing perpendicular to the film plane, producing normalized change in resistance of 12–25%. The term magnetoresistive is used in this application to refer to all these types of magnetoresistive sensors and any others in which a variation in resistance of the sensor due to the application of an external magnetic field is detected. The write transducer technology of the head of the present invention is discussed in further detail below.

The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or "landing" on its corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

Figure 2:
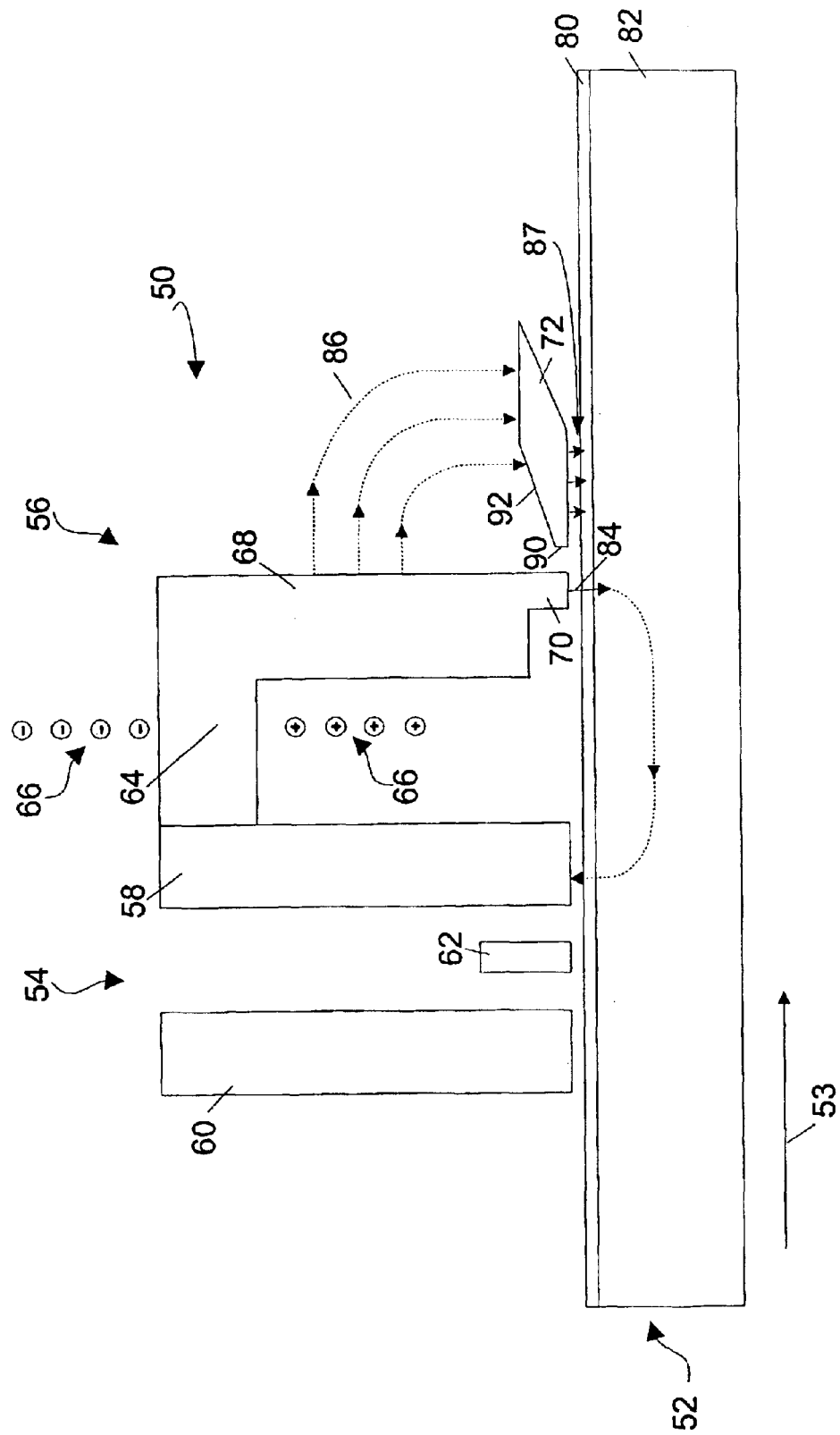
FIG. 2 is a schematic side view of certain elements of a read/write head of the present invention adjacent to a portion of a rotating disk.
Figure 3:
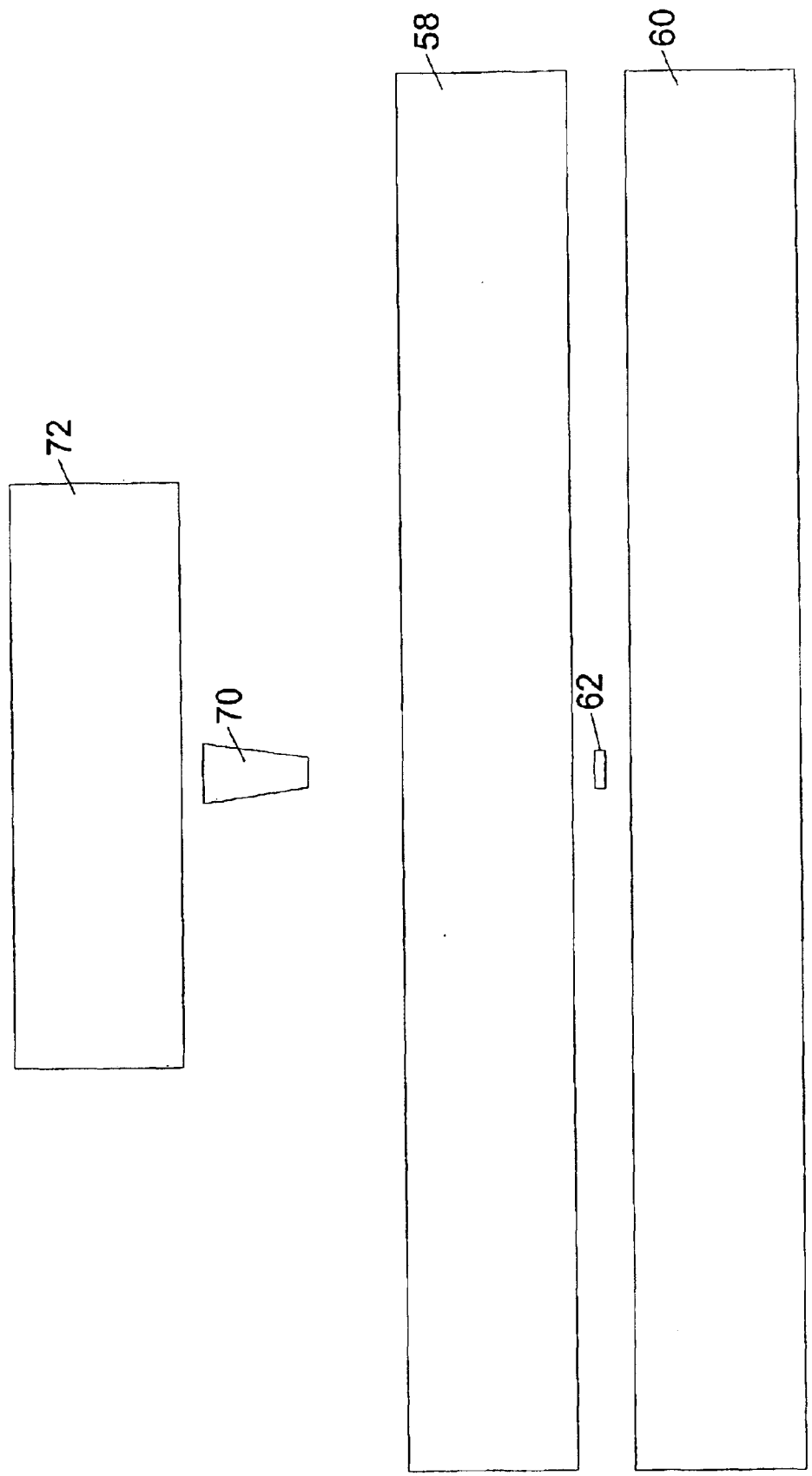
FIG. 3 is a schematic ABS view of the read/write head of FIG. 2.

FIG. 2 illustrates a side view of relevant portions of a read/write head 50 adjacent to a portion of a magnetic recording media 52 that is moving relative to the head 50 in a direction shown by arrow 53. The read/write head 50 includes a read portion 54 and a write portion 56, that together may share a shared shield 58. A simplified ABS view is shown in FIG. 3.

The read portion 54 is of generally conventional construction. The read portion 54 includes a first shield 60 and the shared shield 58. Sandwiched between the shields 58 and 60 and with a slight gap on either side thereof is a magnetoresistive (MR) sensor stripe 62. The MR sensor stripe 62 may utilize any of the various MR sensor technologies, but in this description a GMR sensor is employed.

The write portion 56 of the read/write head 50 includes a write yoke 64 connected at one end to the shared shield 58. Wrapped around the write yoke 64 are a plurality of pancake-shaped electrically conductive coils 66. A write pole 68 may be constructed parallel to the shared shield 58 and in contact at one end thereof with the write yoke 64. The write pole 68 terminates at an opposite end with a write pole tip 70 having a reduced cross-section as compared to the remainder of the write pole 68. FIG. 3 only shows the write pole tip 70 and not the entire write pole 68 above it, which is much wider. The end of the write pole tip 70 is generally aligned (FIG. 2) with the ends of the shields 58 and 60 and the MR sensor stripe 62 and located extremely close to the planar upper surface of the magnetic recording media 52. Located on an opposite side of the write pole 68 from the coil 66 is a floating write shield 72. Further detail and functionality on the floating write shield 72 will be provided below. While it may be more conventional to use the term yoke to refer to the entire combined structure of the shield, the write pole (other than the pole tip), and any magnetic via interconnecting the two, the term yoke is used here to refer to the magnetic via.

The magnetic recording media 52 includes a media layer 80 adjacent to the read/write head 50 and a soft underlayer (SUL) 82 on an opposite side of the media layer 80 from the read/write head 50. As is well known, the media layer 80 may be a magnetically hard material while the SUL 82 may be a magnetically soft material. In other words, the media layer 80 may have a relatively high coercivity and a relatively low permeability as compared to the SUL 82 that has a relatively lower coercivity and a relatively higher permeability. Further, the media layer 80 may have strong perpendicular magnetic anisotropy. Of course, one of the key differences between perpendicular and longitudinal recording is the presence of SUL in the magnetic recording media. The highly permeable SUL 82 causes a great deal of the magnetic flux from the write pole 68 to pass vertically through the media layer 80 into the SUL 82, as is shown by the flux lines 84. In this manner, it has been roughly stated that the media layer 80 is essentially in the write gap of the perpendicular recording arrangement so that gap fields write the data while the data written in the media layer of a longitudinal recording arrangement is written by a fringing field (rather than the stronger field in the gap). This effect is also a function of the spacing from the write pole tip 70 to the SUL 82.

By making the floating write shield 72 spaced apart from the write pole 68, so that the shield 72 is "floating" relative to the write pole 68, it is possible for the write shield 72 to be at a different magnetic potential from the magnetic potential of the write pole 68. The magnetic field (shown by flux lines 86) that exists between the write pole 68 and the write shield 72 can be controlled to be smaller, and to thus minimize the magnetic field from the write shield 72 to the SUL 82, by the geometry and position of the write shield 72 relative to the write pole 68 and SUL 82. In other words, the geometry and position of the write shield 72 relative to the write pole 68 and SUL 82 determines the magnetic impedance between the write pole 68 and the write shield 72 and the magnetic impedance between the write shield 72 and the SUL 82. If the impedance from the write shield 72 to the SUL 82 is much smaller than the impedance from the write shield 72 to the write pole 68, then the magnetic potential between the write shield 72 and the SUL 82 will be small, as is desired. In order to minimize the impedance from the write shield 72 to the SUL 82, it is desirable to increase the area of the shield 72 that faces the SUL 82. Furthermore, it is desirable for the distance from the write pole tip 70 to the closest portion of the floating write shield 72 to be small in order to increase the field gradient passing perpendicularly through the media layer 80 from the write pole tip 70.

The write shield 72 can be seen to have a short throat region 90 and a relatively longer ramp region 92 along the portion of the write shield 72 that is closest to and facing the write pole 68. While it is desirable for the throat region 90 to be close to the write pole tip 70 for reasons discussed above, it is desirable for the remainder of the write shield 72 to be far away from the write pole 68, so as to increase the impedance from the write pole 68 to the write shield 72. The impedance between the Write pole 68 and write shield 72 can be seen to be the combined impedance of parallel impedance paths, one to the throat region 90 and one to the ramp region 92. The impedance to the throat region 90 can be seen to be directly proportional to the gap between the throat region 90 and the write pole tip 70 and inversely proportional to the height of the throat region 90 and the width of the smaller of the pole tip 70 and the throat region 90. The width is the measure of the distance in a horizontal dimension (from side-to-side) in FIG. 3 (in and out of the paper in the FIG. 2), or in other words, across the width of the track of data stored on the magnetic recording media 52. Since other constraints require the gap from the throat region 90 to the write pole tip 70 to be small, it is important for the height of the throat region 90 to be small so as to make the overall impedance from the write pole 68 to the throat region 90 large. The height is the vertical dimension and the thickness is the horizontal dimension in FIG. 2.

The impedance between the write pole 68 and the ramp portion 92 of the write shield 72 can be seen to be inversely proportional to the slope of the ramp relative to the pole, wherein a vertical ramp (effectively no ramp at all) would minimize the impedance while a nearly horizontal ramp (the ramp being nearly perpendicular to the surface of the write pole 68) would maximize the impedance. It has been discovered that an angle of 60° between the surface of the write pole 68 and the ramp region 92 is a suitable slope for the ramp portion 92 based on considerations of manufacturability and impedance.

It has also been discovered that it is not only important for the floating write shield 72 to be sufficiently large to keep the return field, between the shield 72 and the SUL 82, sufficiently low, but in addition it is important to consider fields generated by the pancake coil itself that could return via a path through the air to the write pole 68. The significance of this effect is diminished by providing a high pole-shield impedance design so that the magnetic potential of the floating write shield 72 will be close to the magnetic potential of the SUL layer 82 and a large magnetic potential difference will exist in the space between the write shield 72 and the write pole 68. Thus the magnetic field, as represented by the arrows 86, will be small, and the field from the shield 72 to the SUL 82, as represented by the arrows 87, will also be small, thus fulfilling the purpose of the present invention.

Thus, in summary, by making the write shield 72 have a large surface area facing the SUL 82, minimizing the distance between the write shield 72 and the SUL 82, minimizing the height of the throat region 90, and by maximizing (within reasonable limits) the slope of the ramp region 92, the impedance from the write pole 68 to the floating write shield 72 can be made a great deal larger than the impedance from the write shield 72 to the SUL 82. By controlling the impedances in this fashion, it is possible to keep the magnetic potential of the floating write shield 72 as low as possible. This is desirable because if the magnetic potential of the write shield becomes too high, it is likely that downstream data can be unintentionally erased by the field represented by the arrows 87. Furthermore, as the magnetic potential of the floating write shield 72 differs from the magnetic potential of the SUL 82, the field gradient provided by the write pole tip 70 through the media layer 80 decreases. Of course, it is desirable to maximize this gradient.

Relevant details of the process of manufacturing a read/write head 100 of the present invention will now be discussed in conjunction with FIG. 4. The read/write head 100 has an air-bearing surface 102 that is seen on the right edge of the illustration. Throughout the discussion of this read/write head 100, several conventional layers, such as seed layers, are omitted. In addition, this discussion ignores electrical connections, opening up bonding pads, and so forth. A substrate 103 has a ferromagnetic material deposited thereon to form a first read shield 104. On top of the first read shield 104 a first insulating layer of $Al_2O_3$ 105 is deposited. Then, a conventional GMR sensor stripe 106 is deposited to a certain "height" and the remainder of the layer filled in with aluminum oxide ($Al_2O_3$) layer 108 as an insulator. Of course, the GMR sensor stripe 106 contains many layers as is well known. On top of layer 108, a second read shield 110 is deposited. On top of the second read shield 10, another insulator layer 112 of $Al_2O_3$ is deposited.

On top of the insulator layer 112, a return flux pole 114 is deposited. On top of the return flux pole layer 114 another insulator layer 116 of $Al_2O_3$ is deposited. On top of the insulator layer 116, a layer of hard-baked photoresist 118 with a pancake-shaped arrangement of conductive coils 120 is deposited in a conventional manner. On top of this layer, another insulator layer 122 of $Al_2O_3$ is deposited. At this point, an etching process removes a portion of the previously described layers 116 and 122, exposing a portion of the return flux pole layer 114. Next, a layer of ferromagnetic material is deposited to form the remainder of the write pole 126 that includes a write yoke 127 in the area of layers 116 and 122 that was removed by the etching process. Next, a portion of an insulator layer 124 is deposited on top of the layer 120 near the ABS 102 and much higher up on the read/write head 100. In between these portions of insulator layer 124 is the write pole 126. At this point, a chemo-mechanical polish (CMP) process is applied to optimize the surface of the write pole 126. On top of this layer, a further portion of ferromagnetic material is deposited to form a write pole tip 128 adjacent to the write pole 126 and forming part of the ABS 102. The remainder of this layer is completed with another insulator layer 130. At this point, another CMP process is applied to treat the surface of the write pole tip 128. On top of this layer, another insulator layer 132 of $Al_2O_3$ is deposited to provide a small gap between the write pole tip 128 and the next layer. The next layer includes a portion of hard-baked photoresist material 134 and a ramp portion 137 and throat portion 138 of a floating write shield 136. The floating write shield 136 extends along the ABS 102 for some distance and the remainder of the layer is filled with further hard-baked photoresist material 140. On top of all this, an encapsulation layer 142 of $Al_2O_3$ is provided.

Figure 4:
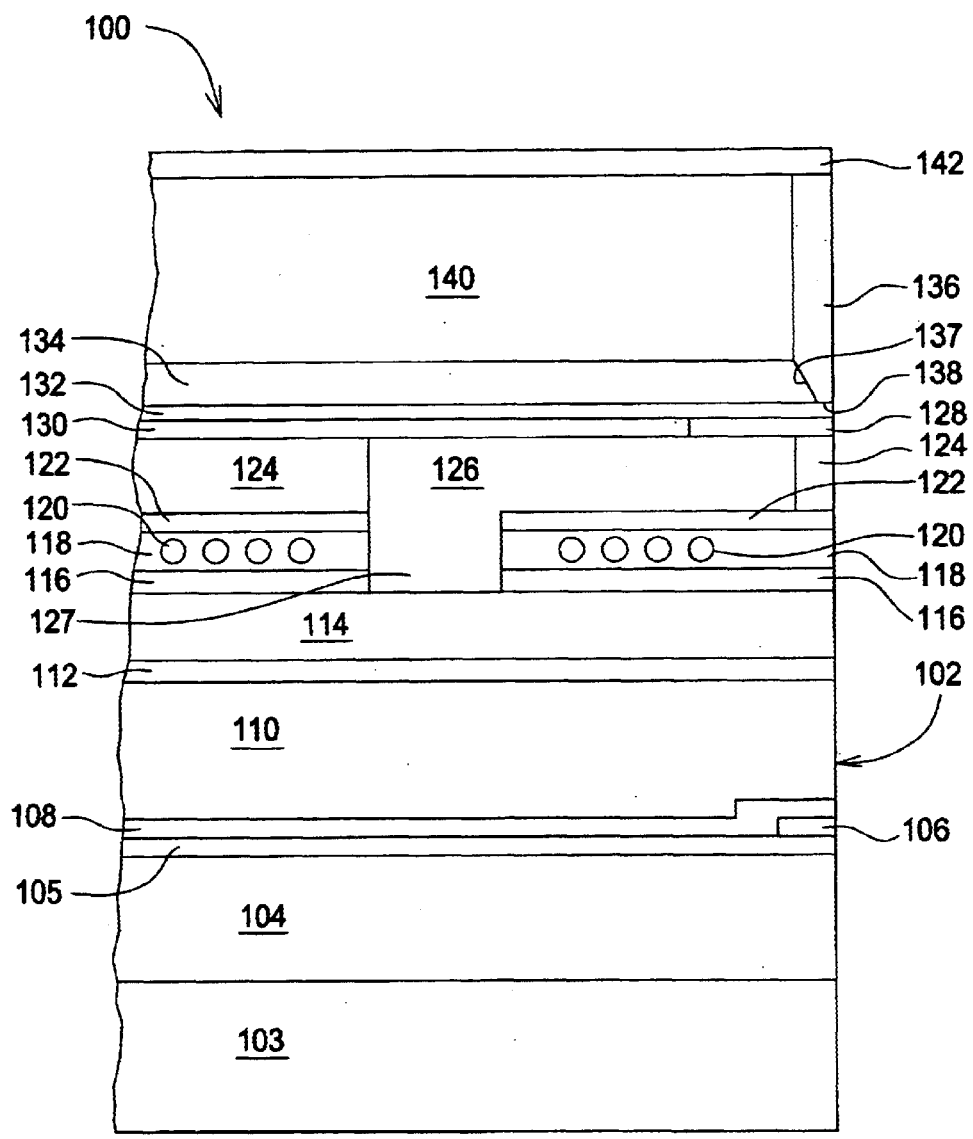
FIG. 4 is a schematic side view of certain elements of a second embodiment of a read/write head of the present invention.

As can be appreciated, the embodiment shown in FIG. 4 differs from the embodiment shown in FIG. 2 at least in the respect that the shields 104 and 110 of the read portion of the read/write head 100 are not used as a pole or shield for the write element.

It is important to note that none of the drawings in this application, particularly FIGS. 2–4, are drawn to scale. It has been discovered, however, that it is preferable for the height of the throat region 90 to be at least equal to one half the distance of the gap from the write pole tip 70 to the floating write shield 72 in the throat region 90. Further, the throat height should be preferably no more than this minimum throat height plus some lapping error. Further, it also appears preferable that the gap distance be approximately equal to the distance from the write pole tip 70 to the SUL layer 82. Because it is desirable to have a throat portion 90 of the floating write shield 72 that has a height within certain limits, it is desirable to align the placement of the throat region 90 with the MR sensor stripe 62 since conventional manufacturing techniques already allow for precise stripe height after lapping operations.

As can be appreciated, the present invention includes a perpendicular recording design that provides a reasonable compromise between increasing the field gradient (by providing a downstream shield that is sufficiently close to the write pole tip), while at the same time decreasing the downstream fringing field (due to the presence, geometry, and location of the same floating write shield), and making a product that is more easily manufacturable. For example, it has been found that the present design can improve the field gradient in the desired area by 35% as compared to an unshielded design. This field gradient improvement results in a signal to noise ratio that is increased by 2.3 dB. This can result in a significant increase of the areal bit density over an unshielded perpendicular design.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A read/write head for a disk drive, the head being suitable for perpendicularly recording data in adjacent magnetic recording media, the head comprising:
    a first and second shield;
    a magnetoresistive sensor located between the first and second shield;
    a write pole located proximate the second shield;
    one or more electrically conductive coils located between the write pole and the second shield; and
    a write shield located proximate an opposite side of the write pole from the second shield, wherein the write shield is spaced apart from the write pole so as not to be in contact therewith.

2. A read/write head as defined in claim 1, further including a yoke located inside of the conductive coils and extending between the write pole and the second shield.

3. A read/write head as defined in claim 1, wherein the write shield is thicker, in a dimension parallel to and closest to the surface of the adjacent magnetic recording media that is generally parallel to the direction of travel of the adjacent magnetic recording media, than is a tip of the write pole closest to the adjacent magnetic recording media, in a corresponding dimension.

4. A read/write head as defined in claim 1, wherein the height dimension of the write shield perpendicular to the surface of the adjacent magnetic recording media is significantly less than the corresponding height dimension of the write pole.

5. A read/write head as defined in claim 1, wherein the write shield is wider, in a dimension parallel to and closest to the surface of the adjacent magnetic recording media that is generally perpendicular to the direction of travel of the adjacent magnetic recording media, than is a tip of the write pole closest to the adjacent magnetic recording media, in a corresponding dimension.

6. A read/write head as defined in claim 1, wherein the area of the write shield that is facing the adjacent magnetic recording media is significantly greater than the area of a tip of the write pole that is facing the adjacent magnetic recording media.

7. A read/write head as defined in claim 1, wherein the write shield has a surface facing toward the write pole that includes a first surface portion and a second surface portion, the first surface portion being relatively closer to the write pole than is the second surface portion.

8. A read/write head as defined in claim 7, wherein the first surface portion is relatively closer to the surface of the adjacent magnetic recording media than is the second surface portion.

9. A read/write head as defined in claim 8, wherein the first surface portion is a throat portion and the second surface portion is a ramp portion.

10. A read/write head as defined in claim 8, wherein the first surface portion of the write shield has a dimension in a direction perpendicular to the adjacent magnetic recording media with a height that is substantially equal to or greater than one-half the distance from the write shield to the write pole.

11. A read/write head as defined in claim 1, wherein the adjacent magnetic recording media is caused to move relative to the read/write head in a direction that causes a given portion of media to pass first by the magnetoresistive sensor and then by the write pole and then by the write shield.

12. A read/write head as defined in claim 1, wherein there are no conductive coils on the opposite side of the write pole from the second shield.

13. A read/write head as defined in claim 1, wherein the one or more electrically conductive coils are in a pancake-shaped arrangement.

14. A read/write head as defined in claim 1, wherein the adjacent magnetic recording media has at least two layers, a media layer relatively closer to the read/write head and a soft underlayer relatively farther from the read/write head;
wherein the distance from the write shield to the soft underlayer is approximately equal to the distance from the write shield to the write pole.

15. A read/write head as defined in claim 1, wherein the magnetic impedance between the write pole and the write shield is significantly greater than the magnetic impedance between the write shield and the adjacent magnetic recording media.

16. A read/write head for a disk drive, the head being suitable for perpendicularly recording data in adjacent magnetic recording media, the head comprising:
a first and second shield; a magnetoresistive sensor located between the first and second shield;
a write pole located proximate the second shield;
one or more electrically conductive coils located between the write pole and the second shield; and
a write shield located proximate an opposite side of the write pole from the second shield;
wherein there are no conductive coils on the opposite side of the write pole from the second shield.

17. A read/write head as defined in claim 16, further including a yoke located inside of the conductive coils and extending between the write pole and the second shield.

18. A read/write head as defined in claim 16, wherein the write shield is thicker, in a dimension parallel to and closest to the surface of the adjacent magnetic recording media that is generally parallel to the direction of travel of the adjacent magnetic recording media, than is a tip of the write pole closest to the adjacent magnetic recording media, in a corresponding dimension.

19. A read/write head as defined in claim 16, wherein the height dimension of the write shield perpendicular to the surface of the adjacent magnetic recording media is significantly less than the corresponding height dimension of the write pole.

20. A read/write head as defined in claim 16, wherein the write shield is wider, in a dimension parallel to and closest to the surface of the adjacent magnetic recording media that is generally perpendicular to the direction of travel of the adjacent magnetic recording media, than is a tip of the write pole closest to the adjacent magnetic recording media, in a corresponding dimension.

21. A read/write head as defined in claim 16, wherein the area of the write shield that is facing the adjacent magnetic recording media is significantly greater than the area of a tip of the write pole that is facing the adjacent magnetic recording media.

22. A read/write head as defined in claim 16, wherein the write shield has a surface facing toward the write pole that includes a first surface portion and a second surface portion, the first surface portion being relatively closer to the write pole than is the second surface portion.

23. A read/write head as defined in claim 22, wherein the first surface portion is relatively closer to the surface of the adjacent magnetic recording media than is the second surface portion.

24. A read/write head as defined in claim 23, wherein the first surface portion is a throat portion and the second surface portion is a ramp portion.

25. A read/write head as defined in claim 23, wherein the first surface portion of the write shield has a dimension in a direction perpendicular to the adjacent magnetic recording media with a height that is substantially equal to or greater than one-half the distance front the first surface portion of the write shield to the write pole.

26. A read/write head as defined in claim 16, wherein the adjacent magnetic recording media is caused to move relative to the read/write head in a direction that causes a given portion of media to pass first by the magnetoresistive sensor and then by the write pole and then by the write shield.

27. A read/write head as defined in claim 16, wherein the one or more electrically conductive coils are in a pancake-shaped arrangement.

28. A read/write head as defined in claim 16, wherein the adjacent magnetic recording media has at least two layers, a media layer relatively closer to the read/write head and a soft underlayer relatively farther from the read/write head;
wherein the distance from the write shield to the soft underlayer is approximately equal to the distance from the write shield to the write pole.

29. A read/write head as defined in claim 16, wherein the write shield is spaced apart from the write pole so as not to be in contact therewith.

30. A read/write head as defined in claim 16, wherein the magnetic impedance between the write pole and the write shield is significantly greater than the magnetic impedance between the write shield and the adjacent magnetic recording media.

31. A read/write head for a disk drive, the head being suitable for perpendicularly recording data in adjacent magnetic recording media, the head comprising:
a read element including:
a first and a second read shield; and
a magnetoresistive sensor located between the first and second read shields; and
a write element including:
a return flux write pole located proximate the second shield;
a main write pole located proximate the return flux write pole;
one or more electrically conductive coils located between the return flux write pole and the main write pole; and
a write shield located proximate an opposite side of the main write pole from the return flux write pole, wherein the write shield is spaced apart from the write pole so as not to be in contact therewith.

32. A read/write head as defined in claim 31, further including a yoke located inside of the conductive coils and extending between the main write pole and the return flux write pole.

33. A read/write head as defined in claim 31, wherein the write shield is thicker, in a dimension parallel to and closest to the surface of the adjacent magnetic recording media that is generally parallel to the direction of travel of the adjacent magnetic recording media, than is a tip of the write pole closest to the adjacent magnetic recording media, in a corresponding dimension.

34. A read/write head as defined in claim 31, wherein the height dimension of the write shield perpendicular to the surface of the adjacent magnetic recording media is significantly less than the corresponding height dimension of the write pole.

35. A read/write head as defined in claim 31, wherein the write shield is wider, in a dimension parallel to and closest to the surface of the adjacent magnetic recording media that is generally perpendicular to the direction of travel of the adjacent magnetic recording media, than is a tip of the write pole closest to the adjacent magnetic recording media, in a corresponding dimension.

36. A read/write head as defined in claim 31, wherein the area of the write shield that is facing the adjacent magnetic recording media is significantly greater than the area of a tip of the write pole that is facing the adjacent magnetic recording media.

37. A read/write head as defined in claim 31, wherein the write shield has a surface facing toward the main write pole that includes a first surface portion and a second surface portion, the first surface portion being relatively closer to the main write pole than is the second surface portion.

38. A read/write head as defined in claim 37, wherein the first surface portion is relatively closer to the surface of the adjacent magnetic recording media than is the second surface portion.

39. A read/write head as defined in claim 38, wherein the first surface portion is a throat portion and the second surface portion is a ramp portion.

40. A read/write head as defined in claim 38, wherein the first surface portion of the write shield has a dimension in a direction perpendicular to the adjacent magnetic recording media with a height that is substantially equal to or greater than one-half the distance from the write shield to the main write pole.

41. A read/write head as defined in claim 31, wherein the adjacent magnetic recording media is caused to move relative to the read/write head in a direction that causes a given portion of media to pass first by the read element and then by the write element.

42. A read/write head as defined in claim 31, wherein there are no conductive coils on the opposite side of the main write pole from the return flux write pole.

43. A read/write head as defined in claim 31, wherein the one or more electrically conductive coils are in a pancake-shaped arrangement.

44. A read/write head as defined in claim 31, wherein the adjacent magnetic recording media has at least two layers, a media layer relatively closer to the read/write head and a soft underlayer relatively farther from the read/write head;
wherein the distance from the write shield to the soft underlayer is approximately equal to the distance from the write shield to the main write pole.

45. A read/write head as defined in claim 31, wherein the magnetic impedance between the main write pole and the write shield is significantly greater than the magnetic impedance between the write shield and the adjacent magnetic recording media.

46. A read/write head for a disk drive, the head being suitable for perpendicularly recording data in adjacent magnetic recording media, the head comprising:

a first and second shield;

a magnetoresistive sensor located between the first and second shield;

a write pole located proximate the second shield;

one or more electrically conductive coils in a pancake-shaped arrangement located between the write pole and the second shield;

a yoke located inside of the conductive coils and extending between the write pole and the second shield; and a write shield located proximate an opposite side of the write pole from the second shield, wherein the write shield is spaced apart from the write pole so as not to be in contact therewith, wherein the write shield is thicker and wider than is a tip of the write pole closest to the adjacent magnetic recording media and the write shield is significantly shorter than the write pole, and wherein the write shield has a surface facing toward the write pole that includes a first surface portion and a second surface portion, the first surface portion being relatively closer to the write pole and to the adjacent magnetic recording media than is the second surface portion;

wherein there are no conductive coils on the opposite side of the write pole from the second shield; and wherein the adjacent magnetic recording media is caused to move relative to the read/write head in a direction that causes a given portion of media to pass first by the magnetoresistive sensor and then by the write pole and then by the write shield.

47. A read/write head as defined in claim 46, wherein the first surface portion is a throat portion and the second surface portion is a ramp portion.

48. A read/write head as defined in claim 46, wherein the first surface portion of the write shield has a dimension in a direction perpendicular to the adjacent magnetic recording media with a height that is substantially equal to or greater than one-half the distance from the write shield to the write pole.

49. A read/write head as defined in claim 48, wherein said dimension of the first surface portion of the write shield is less than the thickness of the tip of the write pole.

50. A read/write head as defined in claim 46, wherein the area of the write shield that is facing the adjacent magnetic recording media is significantly greater than the area of the tip of the write pole.

51. A read/write head as defined in claim 46, wherein the adjacent magnetic recording media has at least two layers, a media layer relatively closer to the read/write head and a soft underlayer relatively farther from the read/write head;
wherein the distance from the write shield to the soft underlayer is approximately equal to the distance from the write shield to the write pole.

52. A read/write head as defined in claim 46, wherein the magnetic impedance between the write pole and the write shield is significantly greater than the magnetic impedance between the write shield and the adjacent magnetic recording media.

* * * * *